United States Patent [19]

Thingstad

[11] 4,336,655
[45] Jun. 29, 1982

[54] RULE OR MEASURING ROD

[76] Inventor: Hans K. Thingstad, Fornbacken 5, 151 58 Södertälje, Sweden

[21] Appl. No.: 174,629

[22] Filed: Aug. 1, 1980

[30] Foreign Application Priority Data

Aug. 1, 1979 [SE] Sweden ............................ 7906655

[51] Int. Cl.³ .......................................... G01B 3/08
[52] U.S. Cl. ................................................ 33/161
[58] Field of Search ............ 33/161, 158, 27 R, 159, 33/160, 27 C

[56] References Cited

U.S. PATENT DOCUMENTS

| | | | |
|---|---|---|---|
| 1,670,509 | 5/1928 | Jung | 33/158 |
| 3,492,737 | 2/1970 | Swanson | 33/161 |
| 3,562,773 | 2/1971 | Wilamowski | 33/158 X |

FOREIGN PATENT DOCUMENTS

| | | | |
|---|---|---|---|
| 51213 | 12/1911 | Austria | 33/158 |
| 907303 | 6/1945 | France | 33/158 |

*Primary Examiner*—Harry N. Haroian
*Attorney, Agent, or Firm*—Burns, Doane, Swecker & Mathis

[57] ABSTRACT

The present invention is in respect of a rule or measuring rod, also referred to occasionally as a measuring stick, and in particular in respect of the type of rule which comprises a number of telescopic components so arranged as to slide in relation to each other. The components may be clamped together in pairs by means of a locking device, and each component is in the form of a rail of U-shaped or essentially U-shaped section. The extremities of the legs of the section are in the form of projections which face each other; the individual components themselves are of identical section, but are of different sizes so that the components are able to slide inside each other.

4 Claims, 6 Drawing Figures

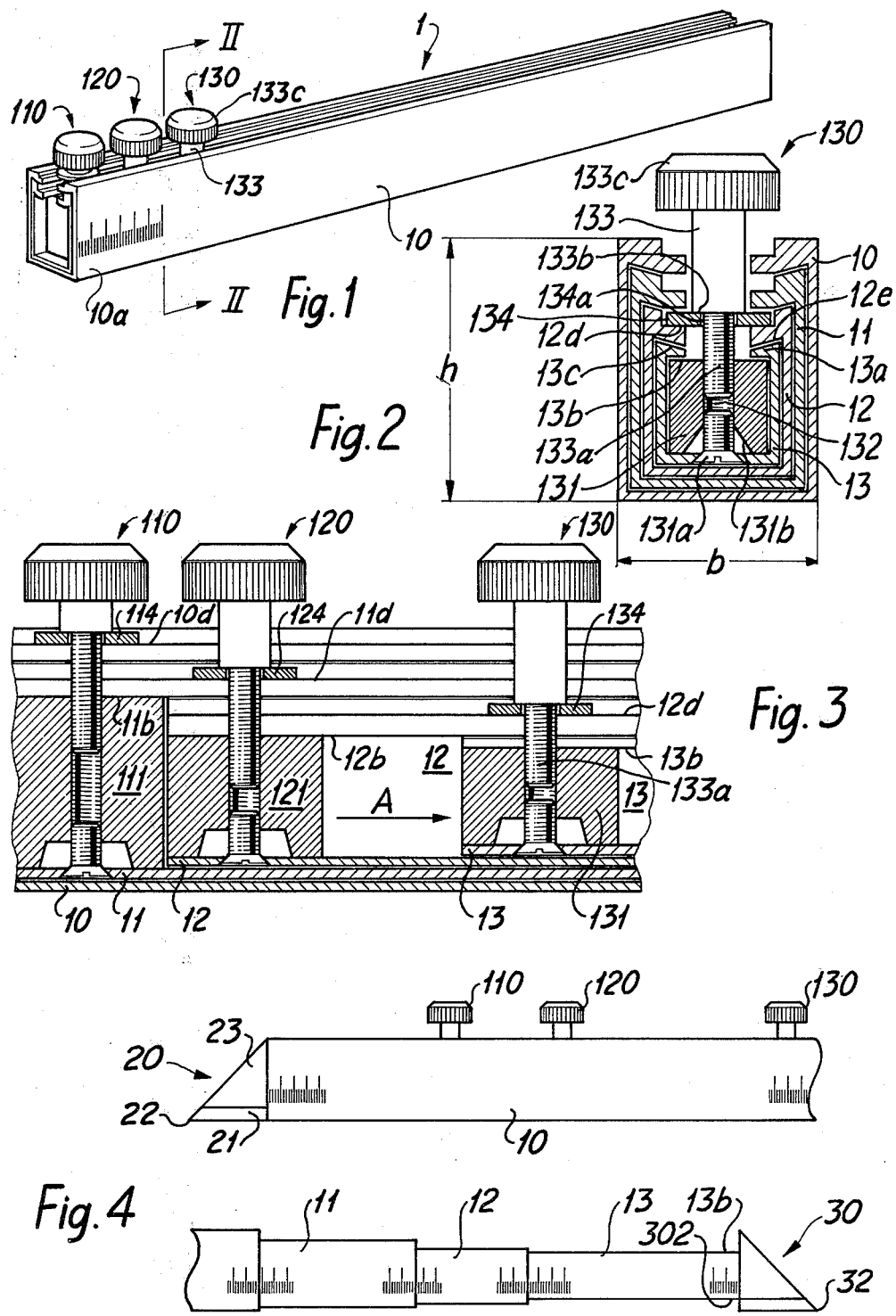

RULE OR MEASURING ROD

STATE OF THE PRIOR ART

The principle whereby rules or measuring rods are designed with telescopic components so arranged as to slide in relation to each other and where each component is in the form of a rail of U-shaped section is already familiar.

An example of the state of the prior art appears in Swedish Pat. No. 119,818. The Swedish patent describes a measurement scale comprising a set of telescopic components with internal friction so arranged as to slide in relation to each other, and which are fitted with at least one locking device projecting from the wall of each of the components in the vicinity of their inside end. These locking devices operate in conjunction with a slot at the outside end of each subsequent component which will receive the locking device for the purpose of clamping the components in their extended position.

We are also familiar through open use with a rule or measuring rod comprising several graduated components of different lengths relative to each other, each of which is so arranged as to telescope and rotate in relation to the others, in addition to which all the components are so arranged that they may be extended from the outermost component in a single direction only and are of U-shaped section. The extremities of the legs of the section are in the form of projections which face each other, and at least one of the locking devices is intended to clamp and lock together pairs of adjacent components.

One existing type of rule for measuring the distance between fixed points on motor vehicles consists of two telescopic components, of which one is produced from a solid section and in which the distance between measuring pins set at right angles to the counter-sliding rule must be measured using a separate tape. This apparatus has the inconvenience that it may not be used unless at least two persons are present in order to measure the distance.

DESCRIPTION OF THE PRESENT INVENTION

TECHNICAL PROBLEM

An engineering problem has long been posed by the keen desire to design rules such as may be used to measure distances of the order of 3-4 m. One objective is that the measuring rod should consist of a small number, usually three or four, of telescopic components, and it is therefore essential that the rail from which the components are made should be designed to have high resistance to bending over its entire length, even when it is stressed only at its ends.

One other problem which is encountered in rules to be used in the measurement of distances of up to 3 or 4 meters is that the locking device between adjacent components must be capable of clamping the components in a satisfactory manner, even when the components are in their fully extended position. The compliance with this requirement has been found to be dependent not only on the specific design of the locking device, but also on the specific design of the component parts of the rule.

The present invention relates specifically to the solution of an extremely complex technical problem. The existing types of rule have normally been used to take so-called inside measurements, which may be done when sufficient space is available between the points of measurement to permit the introduction of a rule.

One particular problem is encountered when measuring the distance between fixed points on motor vehicles, in that existing types of rule for taking inside measurements may not be used because the space between the fixed points or between the points of measurement will not permit access by a rule.

A difficult problem is posed by the keen desire to provide a rule for use in this specific technical application which is of simple design and easily handled.

Finally, a technical problem is posed by the need to produce a rule which on the one hand may be used in the normal area of application for rules, and which on the other hand may be used within the specific technical application concerned with the measurement of fixed points on vehicles.

Solution

The present invention is intended to describe a rule or a measuring rod of such a nature that it will satisfy the above requirements and will resolve the technical problems referred to above.

The solution principally consists of using a rule or measuring rod comprising a number of telescopic components so arranged as to slide in relation to each other, in which pairs of components may be clamped together by means of a locking device. Each component is in the form of a rail of U-shaped or essentially U-shaped section, with the extremities of the legs of the section being in the form of projections which face each other.

What may be regarded as making the greatest contribution to the solution of the combinations of problems referred to above is that one end of the outermost component forms a rigid support for the first clamping device for the first rod, with a second clamping device for the second rod being so arranged that it may slide inside the innermost component.

By permitting the other end of the innermost component to form a stop to the travel of the second clamping device, it is possible, with the first clamping device secured to one end of the outermost component and with the second clamping device secured to the other end of the innermost component, to adjust the relative positions of the rods by extending the components in relation to each other.

By designing the clamping device for the rods to have two holes set at right angles to each other and capable of completely surrounding the rods, it is possible to cause the rods to run in the first hole, thereby forming a right angle with the direction of travel of the rule; but if the rods are caused to run in the second hole, then the rods will lie parallel to the direction of travel.

Advantages

The advantages associated with a measuring rod in accordance with the present invention are not simply that it solves the technical problems referred to above, but also that it has been found to be possible for the rule to be used by only one man when measuring the distance between fixed points up to three meters apart. In this case, the rule may consist of three components, which means that the rule will have a length when closed of approximately one meter.

Thanks to the special design of the clamping device with two holes set at right angles to each other, it is possible to provide a simple and effective location through which the rods may move.

The invention is capable of measuring the distance between fixed points ranging from a few millimeters to three meters, with the rule being operated by only one man as mentioned above.

BRIEF DESCRIPTION OF THE DRAWING FIGURES

A suggested provisional design illustrating the significant characteristics of the present invention is described in greater detail with reference to the attached drawing, in which FIG. 1 is a perspective drawing of a rule or measuring rod with telescopic components in its closed position and without the clamping device;

FIG. 2 is a section through II—II in FIG. 1 on a more enlarged scale;

FIG. 3 shows a longitudinal section through the rule in accordance with FIG. 1 on an enlarged scale and with one of the telescopic components extended slightly to the right;

FIG. 4 is a view in which all the telescopic components have been extended slightly in relation to each other and with extremities of a provisional design;

DESCRIPTION OF THE PREFERRED EMBODIMENT

Figure 5:
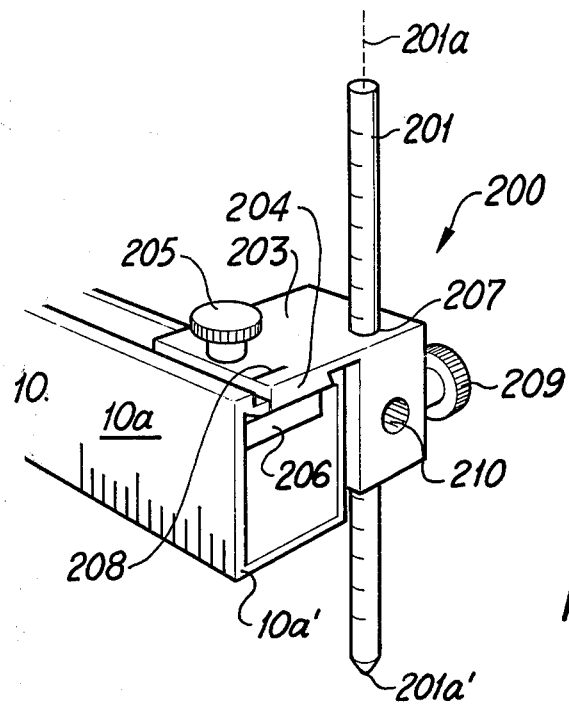
FIG. 5 is a perspective view of the first clamping device described in accordance with the invention for attachment to the one end of the outermost component.

FIG. 1 shows a perspective drawing of a rule or measuring rod in accordance with the present invention with the telescopic components in the closed position. It is clear that the present invention is not restricted to any particular number of telescopic components, for which reason the four telescopic components shown in the suggested design should only be regarded as a provisional number. It may be said, however, that three telescopic components have shown themselves to be a most suitable number when using a rule of this design under practical operating conditions.

The rule thus comprises a number of telescopic components so arranged as to slide in relation to each other, and of which the sectional shape is substantially the same. The rule 1 thus comprises an outer component 10, which, it is suggested, should have a height "h" of about 30 mm and a width "b" of about 23 mm. The telescopic components have been given the references 10, 11, 12 and 13, and the section of the various components may best be seen in FIG. 2. Each component, with the exception of the outermost component 10, is provided with a locking device, whereby the reference 110 is allocated to the locking device for rail 11, the reference 120 to the locking device for rail 12 and the reference 130 to the locking device for rail 13. In view of the fact that the structural design of locking devices 110, 120 and 130 is basically the same, the following description will apply only to locking device 130.

Locking device 130, which is shown in FIG. 2, comprises a clamping block 131 located inside the rail 13, and dimensioned in such a way that it is an interference fit in the interior of the rail 13. The clamping device 130 is intended to be capable of securing the rail 13 in any desired position in relation to the rail 12, and the following description which includes the embodiment of the rail 13 and its interaction with the rail 12 also applies to the interaction between other telescopic components of the rule when acted upon by other locking devices.

The locking device thus comprises the clamping block 131 located inside the rail, which is designed with a central, threaded hole 132. The locking device also includes a movable clamping plate 134 operated by an activator 133, which acts upon the adjacent rail 12. The activator 133 comprises a threaded part 133a which works together with the thread in the hole 132, with the thread in the hole 132 matching the thread in the part 133a. The threaded part 133a then takes on the form of a thrust collar 133b, which is shown in FIG. 2 as a rather heavier part of the activator 133. Finally, the activator 133 is shown to have a wheel 133c which, when rotated in one direction, will enable the clamping plate 134 to be moved in the direction of the clamping block 131, thereby producing a clamping effect between the rails 12 and 13; when the wheel 133c is rotated in the opposite direction, the components 134 and 131 will be caused to move away from each other, thereby releasing the rails 12 and 13 from each other, which will enable the components to be moved in relation to each other.

It may also be seen from FIG. 2 that the rail 13 has at its opening two projections which face each other, and of which only one has been allocated the reference 13a. Each projection 13a exhibits one surface which will interact with the clamping block 131, and to which surface the reference 13b has been allocated. This surface is perpendicular to the longtitudinal axis of the threaded part 133a. There is, however, nothing to prevent this surface from being bevelled so that the surface will lie at an angle to the longitudinal axis of the threaded part within the range 85°-60°, and preferably within the range 80°-70°. Alternatively, this angle may be given an angular value of approximately 75°. The projection 13a also exhibits a second surface which will interact with an adjacent rail, to which surface the reference 13c has been allocated. Surface 13c has been given an angle of 75° in relation to the longtitudinal axis of the threaded part 133a, but it is clear that the second surface 13c may be given other angular values, for example angular values within the range 80°-60°, and preferably within the range 80°-70°. The adjacent rail 12 incorporates the surface 12d, said surface 12d providing a supporting surface for the clamping plate 134. The surface 13c of the rail 13 interacts with surface 12e of rail 12, with each of these surfaces being shaped to correspond to each other, i.e. with corresponding angular values, and because of the force which is created between the surfaces 13c and 12e under the effect of the locking device 130, the rails 12 and 13 are locked in their relative positions.

FIG. 2 also shows that part 133 of the locking device 130 extends through the openings of all the rails 10–13 and through the longtitudinal groove in the respective rails, said groove causing the rail to be U-shaped or essentially U-shaped in section.

The clamping block 131 is permanently attached by means of a screw 131a to the rail 13, with a corresponding hole being incorporated in the base of the rail 13. It is clear, however, that the clamping block 131 could also be secured to the rail 13 without the screw 131a if the clamping block 131 were to incorporate a conical recess 131b, with the base surface of the rail 13 being butted against the recess 131b.

FIG. 3 shows a longtitudinal section through the rule in accordance with FIG. 1 and with one of the telescopic components extended slightly to the right. The component which is extended slightly to the right in accordance with the arrow A is the rail 13. It may be seen from FIG. 3 how the clamping plate 134 makes contact with the surface 12d of the rail 13, whilst the clamping block 131 is in contact with the surface 13b of the rail 13. FIG. 3 also shows how the clamping block 121 belonging to the locking device 120 makes contact with the surface 12b corresponding to the surface 13b of the rail 13. The clamping plate 124 is in contact with the surface 11d corresponding to the surface 12d. FIG. 3 shows that the clamping block 131 is located inside the rail 13, whilst the clamping block 121 is located inside the rail 12.

Finally, it may also be seen from FIG. 3 that the clamping block 111 is located inside the rail 11 and is in contact with the surface 11b corresponding to the surface 13b, whilst the clamping block 114 is in contact with the surface 10d corresponding to the surface 12d. The rails 13 and 11 shown in FIG. 3 have been sectioned for reasons of clarity.

FIG. 4 shows a situation in which all the telescopic components have been extended slightly in relation to each other, with suggested markings also being shown in the Figure. The lower part of the Figure is a continuation of the upper part of the Figure. FIG. 4 shows that the extremities of the rule are provided with pointed ends, of which one is attached to the component 10 and has been allocated the reference 20, whilst the other is attached to the rail 13 and has been allocated the reference 30. Both end fittings are identical and comprise a lower steel rail 21 in order to obtain a precise point of measurement 22, as well as a plastic component 23 applied to the component 21. The components 23 and 21 have been given a combined angle of inclination of approximately 45° in order to provide a well-defined contact point 22. The component 30 is similarly designed to have a well-defined contact point 32.

If is is assumed that the distance recorded by taking an internal measurement produces the setting indicated above, and if the rail 10 is assumed to have a length equivalent to 1031 mm, then it is obvious that the indicated measurement is represented by the sum of the settings for rails 11, 12 and 13, i.e. 6.0, 4.2 and 8.4, which means that the internal measurement has a length of 1049.6 cm. When using the rule in accordance with the present invention under practical operating conditions, it is of course easiest to set rail 11 or rail 12 to the nearest 10 cm above the value indicated for rail 10, so that only rail 13 is used for measuring the number of cm and mm.

FIG. 2 shows that the clamping block 131 has a smooth surface in contact with the surface 13b. It should be noted that the clamping block 121 has the corresponding surface set at an angle so that it will interact with the rail 21. This means that the surface 12e acts to a certain extent as a clamping surface between the components 12 and 13 and to a certain extent as a holding surface for the clamping block 121.

FIG. 5 shows that one end 10a of the outermost component 10 provides rigid support for the first clamping device 200 for the first rod 201.

Figure 6:
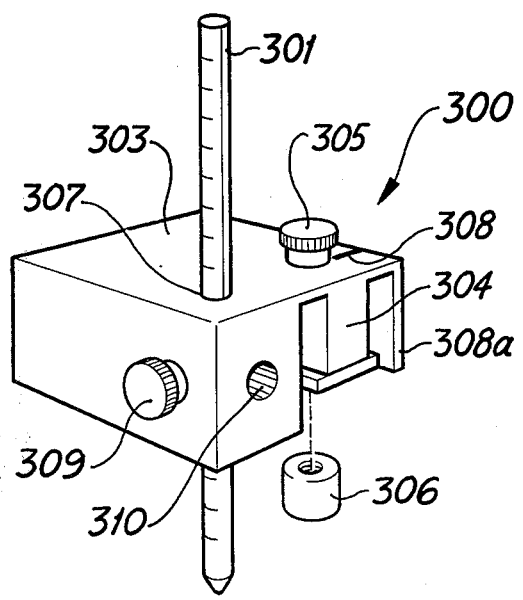
FIG. 6 is a perspective view of the second clamping device described in accordance with the present invention, so arranged as to slide inside the innermost component.

FIG. 6 shows that a second clamping device 300 for a second rod 301 is so arranged that it will slide inside the innermost component 13. The innermost component 13 does not appear in FIG. 6 for reasons of clarity, but FIG. 4 illustrates a stop with the reference 302 located at the other end 13d of the innermost component. This stop is intended to prevent the second clamping device 300 from being extended so far that it leaves the component 13.

With reference to FIG. 5, it may be seen that the clamping device 200 comprises a block 203 with a tongue 204 intended to lie in a groove in the component 10. The clamping device 200 may be firmly attached to one end 10a of the rail 10 by means of a screw 205 with a thread running in a thread in a plate 206. It should be noted at this point that the block 203 contains a hole 207 of which the central axis is located in line with a mark 208, by means of which the central axis 201a and the point 201a' of the rod 201 may pass through the end surface 10a' of the rail 10. The rod 201 may be secured at any desired position in the hole 207 by means of a screw 209. It is important in this context that the hole 207 should lie in a direction which is at right angles to the direction of travel of the rule. A hole 210 is set at right angles to the hole 207, and this hole 210 will also accept the rod 201, which will then adopt an attitude which runs parallel to the direction of travel.

It is clear that the arrangement shown in FIG. 1 is particularly suitable where the points of measurement are located in such a way that the available space between the points of measurement will not permit a rule to be inserted, and in which case the rule may be kept at a certain distance from the points of measurement in question.

With reference to FIG. 6, a second clamping device 300 is shown which is intended to operate in conjunction with the innermost component 13. The second clamping device 300 incorporates a block 303. The block 303 has a heel 304 intended to pass beneath the projections 13a and 13b of the rail 13. A hole passes through component 304 so that a component 305 may pass through the hole with its threaded part, the lower end of which runs in a nut 306. By forcing the nut 306 downwards against the innermost surface of the component 13, it is thus possible to secure the clamping device 300 in any desired position along the length of the component 13, irrespective of the relative position of the component 13 to the other components of the rule.

In a similar manner to that shown in FIG. 5, a wheel 309 is fitted, by means of which the rod 301 may be advanced and secured in any desired position in the hole 307. A further hole 310 is also provided so that the rod 301 may be set to run parallel to the direction of travel of the rule. The clamping device 300 also has a mark 308 which may best be positioned on the component 308a, which will permit a simple reading of the scale to be used to determine the distance between the points of measurement.

With the first clamping device 200 attached to the one end 10a of the outermost component 10 and with the second clamping device 300 attached to the other end 13b of the innermost component 13, it is possible to increase the relative position of the rods 201 and 301 by extending the components 10-11 relative to each other.

This invention is not, of course, restricted to the above embodiment, which is given by way of an example, but may be subjected to modifications within the scope of the following claims.

I claim:
1. A rule or measuring rod comprising a plurality of telescopic components arranged to slide in relation to each other, two components may be clamped together by a locking device, each component being in the form of a rail of substantially U-shaped cross section, the extremities of the legs of each of the sections are in the form of projections which face each other, one end of the outermost component provides a rigid support for a clamping device for one rod, a second clamping device for a second rod being arranged to slide inside the innermost component, an end of the innermost component remote from the one end of the outermost component includes a stop to restrict the travel of the second clamping device, whereby with the first clamping device attached to the one end of the outermost component and with the second clamping device attached to the end of the innermost component, the relative position of the rods may be increased by extending the components relative to each other, each of the clamping devices for the rods is provided with two holes set at right angles to each other and capable of completely surrounding the respective rod, each of the rods forms a right angle to the direction of travel of the components when positioned in a first hole, each of the rods being parallel to the direction of travel when positioned in a second hole in a respective clamping device, and a single clamping screw is provided to secure the respective rod either in one or the other of the two holes in each clamping device.

2. The rule as in claim 1, wherein the first clamping device is attached to the one end of the outermost component by a movable clamping plate and screw arrangement.

3. The rule as in claim 1, wherein the second clamping device is attached to the innermost component by a fixed plate and movable nut arrangement.

4. The rule as in claim 1, wherein one end of at least one of the rods supports a sleeve fitted with a pen.

* * * * *